Figure 1:
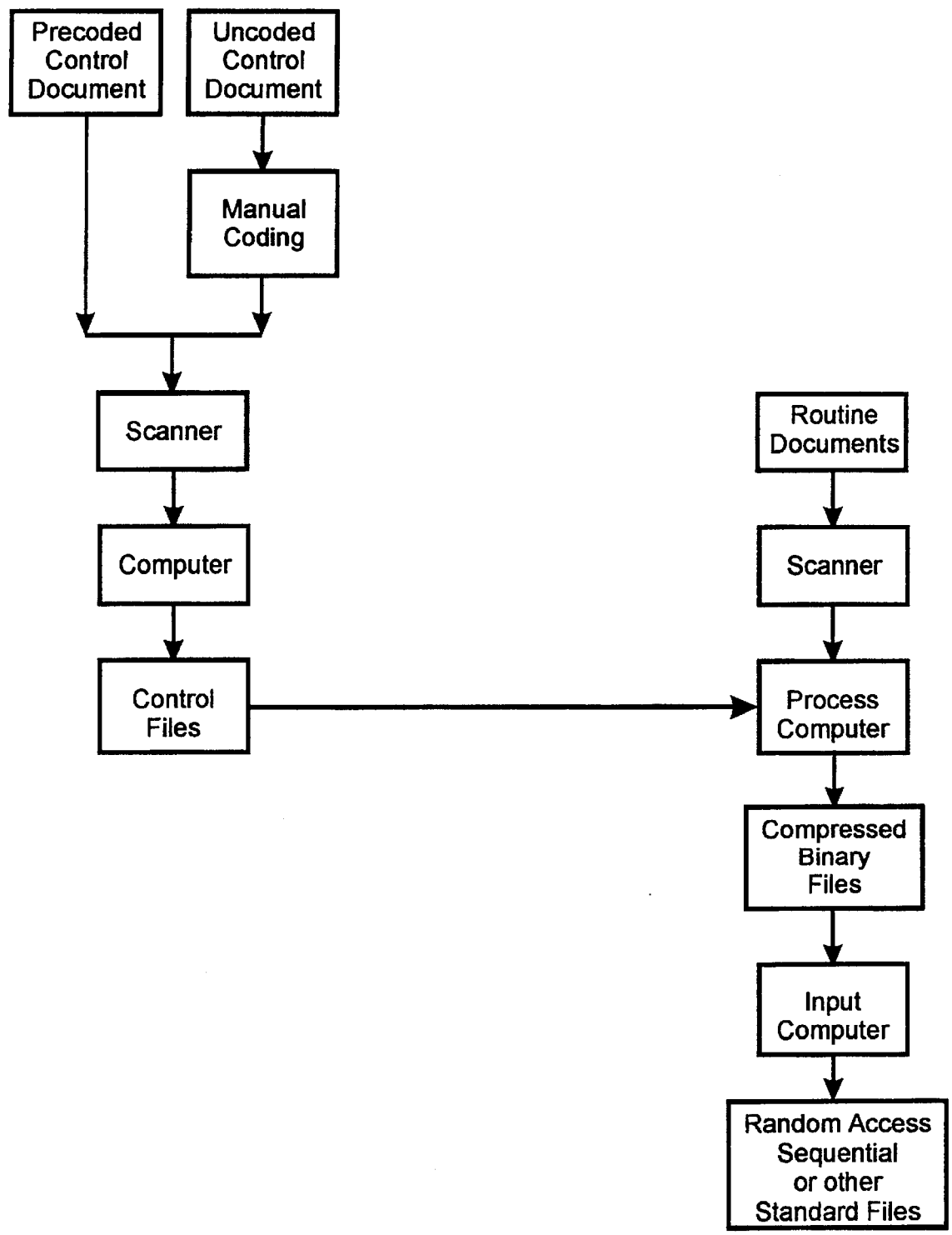

United States Patent [19]

Dunn

[11] Patent Number: 5,655,027
[45] Date of Patent: Aug. 5, 1997

[54] CONTINUOUS EXTRACTION AND PROCESSING OF DOCUMENT FIELDS

[76] Inventor: Harold P. Dunn, 606 Lindenwood Dr., Houston, Tex. 77024-6912

[21] Appl. No.: 651,475

[22] Filed: May 22, 1996

[51] Int. Cl.$^6$ .................................................. G06K 9/34
[52] U.S. Cl. ........................ 382/173; 382/168; 382/313; 235/375
[58] Field of Search ........................... 382/9, 18, 59; 235/375; 355/200

[56] References Cited

U.S. PATENT DOCUMENTS

| | | | |
|---|---|---|---|
| 3,558,859 | 1/1971 | Frederick | 382/9 X |
| 3,610,893 | 10/1971 | Clark et al. | |
| 3,870,865 | 3/1975 | Schneiderhan et al. | |
| 4,408,342 | 10/1983 | Grabowski et al. | 382/9 |
| 4,516,262 | 5/1985 | Sakurai | 382/18 |
| 5,023,435 | 6/1991 | Deniger | |
| 5,051,779 | 9/1991 | Hikawa | 355/200 |
| 5,123,064 | 6/1992 | Hacker | 382/59 |
| 5,181,255 | 1/1993 | Bloomberg | 382/9 |
| 5,198,642 | 3/1993 | Deniger | |
| 5,402,504 | 3/1995 | Bloomberg | 382/9 |

*Primary Examiner*—Harold Pitts

[57] ABSTRACT

A method is provided for a computer to extract information in graphical form from a continuous flow of routine documents in order to eliminate further movement of these documents and dramatically reduce the time and volume of inputting. The method consists of preparing a control document for each type of document to be processed. Areas of the document requiring extraction are those identifying the respondent to the document and the information the respondent enters on the document. These areas are color-shaded, or otherwise coded, on the control document. The control document is run through a scanner so that a computer can identify and store the rectangular location of these areas to be extracted. Routine documents of the type can then be continuously processed through a scanner. The areas of interest are extracted by a computer and stored in compressed form as a record in a binary file for that document type. The binary file may be electronically or physically transmitted to any site desired where clerk typists can input at maximum efficiency.

1 Claim, 1 Drawing Sheet

CONTINUOUS EXTRACTION AND PROCESSING OF DOCUMENT FIELDS

BACKGROUND—FIELD OF INVENTION

This invention provides a method for the rapid and routine retrieving, filing and compressing by computer of handwritten and typewritten material entered on routine documents to enable speedier electronic transfer and input than present systems.

BACKGROUND—DESCRIPTION OF PRIOR ART

Numerous government agencies and private businesses receive a multitude of standardized and routine documents from the public. These have been completed according to the dictates of the document. Some blanks are filled in by hand printing, or in hand script, others by typewriter. Letters, numbers and even drawings may appear.

Typist clerks employed or contracted by the receiving entity must input the entered material into machine text files capable of being read by the computer in order to provide the benefits of computer manipulation. Some highly specific operations allow the material to be input by machine but these are rare and seldom practical for general business operations.

Depending on volume and economics, the inputting may be done at the receiving location or at some remote facility dedicated to such operations. Cumbersome physical documents, or massive computer scan files containing the total document digitization must be handled.

Prior art attempted to remove the need for the physical document or massive graphical files. However these efforts applied to only highly specific cases or are not suitable for high volume, routine activities. Following are the various methods:

a. U.S. Pat. No. 3,610,893 to Clark and Cowger (1971) describes the use of templates to restrict taxpayers who, while completing their tax returns, are limited to tiny, specific areas of the document. This patent is primarily directed at the numbers on tax forms and is not usable for general documents.

b. U.S. Pat. No. 3,870,865 to Schneiderban et al. (1975) describes the reading of coded lines or perforations, not conducive to handwritten or typewritten general material.

c. U.S. Pat. No. 4,516,262 to Sakurai (1985) describes a method of recognizing Japanese kanas or kanjis characters, not suitable for ordinary western documents.

d. U.S. Pat. No. 5,023,435 to Deniger (1991) describes a system for reading preprinted answer blocks on forms. A number of selections are offered and the client selects one. Not usable for general document returns.

e. U.S. Pat. No. 5,123,064 to Hacker and Walter (1992) describes a hand-held device for reading selected material from documents. The process would be far too time-consuming for the usual hundreds or thousands of copies of a typical standard document processed by government and business.

f. U.S. Pat. No. 5,181,255 to Bloomberg (1993) describes a computer program that identifies and isolates either handwritten or typewritten text. The process would be uneconomic for routine document processing. Every document copy must be analyzed, files are not standardized and the material is not conducive to inputting.

g. U.S. Pat. No. 5,198,642 to Deniger (1993) is a reissue of U.S. Pat. No. 5,023,435 noted above and the same comments apply.

h. U.S. Pat. No. 5,402,504 to Bloomberg and Withgott (1995) is an expansion and reissue of U.S. Pat. No. 5,181,255 noted above and the same comments apply.

OBJECTS AND ADVANTAGES

My patent reduces the physical mass of the completed document down to a graphical computer file holding only information to identify the respondent and the material filled into the original blanks. Not only is further handling of the document's paper eliminated, but also its boiler plate printing is jettisoned.

Even this minor electronic volume is reduced dramatically through memory compression. The relatively coarse nature of the information graphically stored permits high compression without loss of clarity.

The movement of original documents within an office building to the typist pool for input is an expensive and clumsy operation. In many cases, where thousands of documents must be input, economics demand that the typist pool be in another city, or even another country. My patent permits electronic transfer of the binary files, or, if electronic connections are impractical, the transport of small computer disks.

The inputting operation itself is greatly simplified and speeded in my patent because the typist doesn't need to handle the physical document or even electronically call up an existing respondent's file. The graphical depiction, expanded from its compressed mode, appears on his or her screen and is input on the same screen. If the respondent already has a file, the identifier fields automatically call up that file to receive the typist input.

In unusual cases, such as when only typewritten material is received, the filled-in information may be conducive to computer recognition methods. My patent provides more rapid processing of the original document than prior art into a pure file of pertinent data for the OCR system to analyze.

SUMMARY, RAMIFICATION AND SCOPE

Accordingly, the reader will see that this patent will greatly reduce a major administrative cost for business and government. Paper handling is expensive. Electronic file transfer is immediate and cheap. My patent converts the onerous task of manipulating and transporting mounds of routine paper into the simple and flexible mode of graphical computer files.

DESCRIPTION—FIG. 1

The method to accomplish the ends of this patent comprises three steps which lead to the success of the fourth:
1. Prepare the control document.
2. Process the control document.
3. Process routine documents.
4. Subsequent operations.

Note: The word "blank" or "blanks" as used below refers to the blank spaces on a routine document into which the respondent fills in information, either by hand or typewriter.

1. Prepare the Control Document

An unused copy of the routine document, or the pertinent section of a routine document, to be processed under the method is prepared to be the control document as follows:

a. Documents precoded specifically for this patent method—During the printing process, respondent identifier areas and the blanks are color-shaded or otherwise coded so that the computer can determine their location and dimensions. No further manual work is needed for the preparation phase.

b. Normal documents, no precoding— Areas of the document in which respondents are identified, such as by policy number and/or name and address, are manually color-shaded or otherwise coded so that the computer can determine their location and dimensions.

Each blank is manually color-shaded or otherwise coded but in a different manner than the respondent identifiers. Contiguous blanks, either vertically or horizontally, may require separate coding for isolation. Alternatively, adjacent blanks may be joined either vertically or horizontally as desired.

2. Process the Control Document a. The control document is converted through a conventional scanner capable of color identification into a bitmap or other digital graphics storage code.

Note: All of the software described for the method is readily developed by a reasonably experienced programmer through existing Visual Basic, C++ or other languages.

b. A document identification number and title is entered.

c. The computer processes the digitally stored control document:

detects the first line of boiler plate text or number on the document and determines the x and y coordinates of the top of the start of said first line. All further measurements are referenced to this point, called the primary point, in order to neutralize any scanner slippage that might arise.

detects each coded area and determines the four x and y coordinates of the rectangle for said identifier or blank.

files the rectangular coordinates, relative to the primary point, of the coded areas in the document record for that identification number and title.

structures a data base file to receive the information from processing routine documents of the control type.

3. Process Routine Documents

Documents received from respondents are accumulated by type of document and are batch or continuously processed through the system by type of document. If only a portion of the document is to be processed, and was so arranged in the control document phase, this portion must be physically separated from the main document.

From Step 2 above, a computer file now contains the identification number, the title, and the relative coordinates for the four corners of all identifiers and blanks for each type document to be processed. Another file holds the binary file structure necessary to receive the graphical fields.

Prior to routine processing of a document type, the identification number of the document is entered. The computer then retrieves the title and rectangular coordinate information for that document and is prepared to process the routine documents.

Routine documents are fed into the scanner individually or through a batch loader. The scanner digitizes each document into bitmap or other form. The computer then identifies the primary point on the routine document.

identifies each of the identifier areas from the rectangular coordinates on file and extracts all the information from those rectangles in graphical form.

identifies each of the blank areas from the rectangular coordinates on file and extracts all the information from those rectangles in graphical form.

files the binary images of the graphical information in a data base under the document identification number and title. Each routine document constitutes a record and the information from each blank a field in that record.

clears the bitmap or other initial graphic so that the next routine document may be scanned and processed. In this method, the computer system stays far ahead of the scanning process and no interference occurs.

through OCR techniques, converts the identifier fields of the binary file to machine text able to be read by computer programs.

compresses the binary file or files to the extent permitted by the information in the blanks. A compression ratio of ten or twenty to one would be expected.

Note: Documents precoded specifically for this system will exhibit color-shading or other coding on all copies. The computer could simply search for these coded areas. However this procedure is slower than the rectangular coordinate method described above. It is not recommended for routine processing as it may interfere with the continuous flow of scanned material.

4. Subsequent Operations

The compressed binary files may be transferred to another location for inputting by any of the following existing and common means:

1) Computer disk
  2) Local area network (LAN)
  3) Modem wired transmission
  4) Modem wireless transmission
  5) Other digital or manual method At a computer located in the same office, or anywhere in the world, the compressed files are received, expanded to normal format and displayed on the computer screen of the data clerk. The screen may display a top window with the raw graphical material of each record and a bottom window for inputting, or any other suitable and practical arrangement.

The computer will read the identifier fields of each record. If the respondent has an existing file and the file is accessible from the inputting computer, the computer will bring the file into memory to receive the newly entered material. If no file exists or the file is not accessible, the computer automatically inserts the identifier information into the new file being input. The clerk typist never has to type basic identifier material except when such material is filled in by the respondent.

The typist will then input the entered data without having to shuffle papers or leave the computer.

If the raw information is suitably formatted, such as certain typewritten material, the expanded files may be input through OCR processing.

I claim:

1. A method for extracting handwritten or typewritten information from a continuous flow of documents, or parts of documents, comprising the steps of:

a. coding the identification areas of a control document, and b. coding the blank areas to be filled-in of a control document, and c. scanning said control document, and d. calculating and filing by computer the location of said coded areas, and e. reading and filing in binary form by computer the contents of the coded areas from continuously processed routine documents, and f. converting the identifier fields to machine readable text through OCR techniques, and g. compressing the binary data electronically, whereby the files may be transmitted electronically, or transported physically on small disks, to the most economic possible location for inputting, whether local to or remote from the document receiving location, without the necessity of moving paper or massive computer files, or requiring excessive input time.

* * * * *